United States Patent [19] [11] 4,055,248
Marsan [45] Oct. 25, 1977

[54] FABRIC TREATING COMPOSITIONS AND ARTICLES

[75] Inventor: Mario S. Marsan, Cincinnati, Ohio
[73] Assignee: The Procter & Gamble Company, Cincinnati, Ohio

[21] Appl. No.: 713,935
[22] Filed: Aug. 12, 1976

Related U.S. Application Data

[62] Division of Ser. No. 533,742, Dec. 17, 1974, Pat. No. 3,989,631.

[51] Int. Cl.² .......... A23F 1/08
[52] U.S. Cl. .......... 206/.5; 252/8.8; 427/242; 428/274
[58] Field of Search .......... 252/8.8, 8.6; 206/.5; 427/242; 428/274

[56] References Cited

U.S. PATENT DOCUMENTS

| | | | |
|---|---|---|---|
| 2,746,887 | 5/1956 | O'Neill | 252/8.6 |
| 3,095,373 | 6/1963 | Blomfield | 252/8.8 |
| 3,594,212 | 7/1971 | Ditsch | 428/274 |
| 3,630,929 | 12/1971 | Dijk | 252/8.8 UX |
| 3,886,075 | 5/1975 | Bernardino | 252/8.8 |
| 3,966,629 | 6/1976 | Dumbrell | 252/8.6 |

*Primary Examiner*—William E. Schulz
*Attorney, Agent, or Firm*—Rose Ann Dabek; Jerry J. Yetter; Richard C. Witte

[57] ABSTRACT

Fabric conditioning compositions and articles comprising certain water-insoluble particulate clays and dispensing means especially adapted for use in automatic clothes dryers are described.

9 Claims, No Drawings

FABRIC TREATING COMPOSITIONS AND ARTICLES

This is a division, of application Ser No. 533,742, filed Dec. 17, 1974 and now U.S. Pat. No. 3,989,631.

BACKGROUND OF THE INVENTION

This invention relates to certain particulate clay compositions and to articles and methods for treating fabrics therewith. In a preferred mode, particulate clays releasably combined with a dispensing means are used in an automatic clothes dryer to soften and impart anti-static benefits to the fabrics concurrently with a drying operation.

Treating fabrics in an automatic clothes dryer has recently been shown to be an effective means for conditioning and imparting desirable tactile properties thereto. In particular, it is becoming common to soften fabrics in an automatic clothes dryer rather than during the rinse cycle of a laundering operation. Treating fabrics in the dryer, rather than in the wash, enables the formulator of fabric conditioners to develop and use materials which may not be compatible with detergents. Moreover, the user of dryer-added conditioners is not compelled to make the special effort required with many rinse-added products.

The art-disclosed dryer-added fabric softeners and conditioners use various organic chemicals as the active conditioning agents. These agents, in turn, are based on petrochemicals. In light of the short supply of petroleum-based feedstocks needed to prepare the organic softeners and fabric conditioners, it would be desirable to provide inorganic agents which can be employed to soften and condition fabrics.

The present invention is based on the discovery that certain clay minerals can be applied to fabrics either from an aqueous bath or in a clothes dryer to impart desirable softness and anti-static benefits thereto.

It is an object of the present invention to condition fabrics (i.e., soften and provide anti-static benefits).

It is another object herein to provide articles which can be added to a clothes dryer to condition fabrics concurrently with a drying operation.

These and other objects are obtained herein as will be seen from the following disclosure.

DESCRIPTION OF THE PRIOR ART

U.S. Pat. No. 3,822,145, Liebowitz, et al., FABRIC SOFTENING, issued July 2, 1974, relates to the use of spherical materials as fabric softening agents. U.S. Pat. Nos. 3,743,534, Zamora, et al., PROCESS FOR SOFTENING FABRICS IN A DRYER, issued July 3, 1973; 3,698,095, Grand, et al., FIBER CONDITIONING ARTICLE, issued Oct. 17, 1972; 3,686,025, Morton, TEXTILE SOFTENING AGENTS IMPREGNATED INTO ABSORBENT MATERIALS, issued Aug. 22, 1972; 3,676,199, Hewitt, et al., FABRIC CONDITIONING ARTICLE AND USE THEREOF, issued July 11, 1972; 3,633,538, Hoeflin, SPHERICAL DEVICE FOR CONDITIONING FABRICS IN DRYER, issued Jan. 11, 1972; 3,634,947, Furgal, COATING APPARATUS, issued Jan. 18, 1972; 3,632,396, Zamora, DRYER-ADDED FABRIC-SOFTENING COMPOSITIONS, issued Jan. 4, 1972; and 3,442,692, Gaiser, METHOD OF CONDITIONING FABRICS, issued May 6, 1969, each relate to articles and methods for conditioning fabrics in automatic dryers. U.S. Pat. No. 3,594,212, Ditsch, TREATMENT OF FIBROUS MATERIALS WITH MONTMORILLONITE CLAYS AND POLYAMINES AND POLYQUATERNARY AMMONIUM COMPOUNDS relates to the treatment of fibrous materials with clays and amine or ammonium compounds.

The co-pending application of Edwards and Diehl, entitled FABRIC SOFTENING COMPOSITIONS WITH IMPROVED CONDITIONING PROPERTIES, Ser. No. 357,130, filed May 4, 1973, discloses mixtures of fabric softeners and particulate, non-clay conditioners. The co-pending applications of Murphy, et al., Ser. Nos. 417,329, filed Nov. 19, 1973; 440,931, filed Feb. 8, 1974; 440,932, filed Feb. 8, 1974; and Murphy, et al., Ser. No. 461,311, filed Apr. 16, 1974; and Zaki, Ser. No. 461,312, filed Apr. 16, 1974, each relate to dryer-added fabric softeners and articles of various types.

U.S. Pat. No. 3,716,488, Kolsky, et al., TEXTILE FABRIC CLEANING COMPOSITIONS, issued Feb. 13, 1973, relates to smectite clays in detergent compositions.

U.S. Pat. No. 3,765,911, Knowles, et al., PROCESSING OF RUBBER AND THE LIKE, and to processing compositions therefor, discloses certain soap + colloidal clay particle compositions as anti-tack coatings on solid substrates.

Various other patents relate to the use of clays in detergent compositions, and the like, for treating fabrics; see U.S. Pat. Nos. 3,033,699; 3,594,221; 3,594,212 (clay + quaternary compound); 3,625,505; 2,625,513; 2,770,600; 2,594,257; 2,594,258; 2,920,045; 2,708,185; and 2,819,228 (clay + quat). See also British Pat. No. 461,221.

SUMMARY OF THE INVENTION

The instant invention is based on the discovery that certain clays can be applied to clothing and fabrics and are substantive thereto. Properly chosen clays of the type disclosed hereinafter are not visible on the fabric surface, yet provide softness and static control. Various combinations of Laponite ® and smectite-type clays are especially useful in this regard. The clays can optionally be applied to fabrics concurrently with organic fabric conditioning agents of various types.

The clay materials of this invention can be used in combination with a dispensing means to provide an article containing a pre-measured amount of said clays. The dispensing means is designed to dispense the clay evenly and efficiently onto fabric surfaces, for example by the tumbling action of an automatic clothes dryer.

In its process aspect, this invention encompasses a process for conditioning fabrics comprising applying the particulate clays of the type disclosed herein to fabrics. This process is preferably carried out by combining an article of the type diclosed above with damp fabrics in an automatic clothes dryer and operating the dryer, with tumbling, in standard fashion.

DETAILED DESCRIPTION OF THE INVENTION

The compositions and articles herein comprise multiple components, each of which are described, in turn below.

CLAYS

The substantially water-insoluble particulate clays used in the instant invention are of three types. These clays can be used singly, or in combination, as hereinafter described.

a. Smectite-type Clays — Smectite clays can be employed in the present compositions, articles and processes to impart softness benefits to fabrics. The smectite clays can be described as impalpable, expandable, three-layer clays, i.e., alumino-silicates and magnesium silicates, having an ion exchange capacity of at least about 50 meg/100 g. of clay. The term "impalpable" as used to describe the clays employed herein means that the individual clay particles are of a size that they cannot be perceived tactilely. (Of course, this is important since the clay should not make the treated fabric gritty.) Such particle sizes are within the range below about 50 microns. In general, the smectite clays used herein have a particle size within the range of from about 0.05 microns to about 25 microns, with the smaller particles being preferred since they are less noticeable on fabric surfaces. The term "expandable" as used to describe clays relates to the ability of the layered clay structure to be swollen, or expanded, on contact with water. Such three-layer expandable clays are classified geologically as smectites.

There are two distinct classes of smectite-type clays useful herein. In the first, aluminum oxide is present in the silicate crystal lattice; in the second class of smectites, magnesium oxide is present in the silicate crystal lattice. The general formulas of these smectites are $Al_2(Si_2O_5)_2(OH)_2$ and $Mg_3(Si_2O)_5(OH)_2$, for the aluminum and magnesium oxide type clays, respectively. It is to be recognized that the range of the water of hydration in the above formulas can vary with the processing to which the clay has been subjected. This is immaterial to the use of the smectite clays in the present invention in that the expandable characteristics of the hydrated clays are dictated by the silicate lattice structure. Furthermore, atom substitution by iron and magnesium can occur within the crystal lattice of the smectites, while metal cations such as $N^{30}$, $Ca^{++}$, as well as $H^+$, can be co-present in the water of hydration to provide electrical neutrality. Except as noted hereinafter, such cation substitutions are immaterial to the use of the clays herein since the desirable physical properties of the clays are not substantially altered thereby.

The three-layer, expandable alumino-silicates useful herein are further characterized by a dioctahedral crystal lattice, while the expandable three-layer magnesium silicates have a trioctahedral crystal lattice.

As noted hereinabove, the smectite-type clays employed in the instant invention can contain cationic counterions such as protons, sodium ions, potassium ions, calcium ion, magnesium ion, and the like. It is customary to distinguish between clays on the basis of one cation predominantly or exclusively absorbed. For example, a sodium clay is one in which the absorbed cation is predominantly sodium. Such absorbed cations can become involved in equilibrium exchange reactions with cations present in aqueous solutions. In such equilibrium reactions, one equivalent weight of solution cation replaces an equivalent weight of sodium, for example, and it is customary to measure clay cation exchange capacity (sometimes called "base exchange capacity") in terms of milliequivalents per 100 g. of clay (meq/100 g.). The cation exchange capacity of clays can be measured in several ways, including electrodialysis, by exchange with ammonium ion followed by titration, or by a methylene blue procedure, all as fully set forth in Grimshaw, *The Chemistry and Physics of Clays*, Interscience Publishers, Inc. pp. 264–265 (1971). The cation exchange capacity of a clay mineral relates to such factors as the expandable properties of the clay, the charge of the clay, which in turn, is determined at least in part by the lattice structure, and the like. The ion exchange capacity of clays varies widely in the range from about 2meq/100 g. for kaolinites to about 150 meq/100 g., and greater, for certain clays of the montmorillonite variety. Illite clays have an ion exchange capacity somewhere in the lower portion of the range, ca. 26 meq/100 g. for an average illite clay.

It has been determined that illite and kaolinite clays, with their relatively low ion exchange capacities, are not useful in the instant compositions. Indeed, such illite and kaolinite clays constitute a major component of clay soils. However, smectites, such as nontronite, having an ion exchange capacity of approximately 50 meq/100 g.; saponite, which has an ion exchange capacity of around 70 meq/100 g.; and montmorillonite, which has an ion exchange capacity greater than 70 meq/100 g., have been found to be useful fabric softeners. Accordingly, the first type of clay mineral useful herein can be characterized as impalpable, expandable, three-layer smectite-type clays having an ion exchange capacity of at least about 50 meq/100 g.

The smectite clays used as fabric softeners herein are all commercially available. Such clays include, for example, montmorillonite, volchonskoite, nontronite, hectorite, saponite, sauconite, and vermiculite. The clays herein are available under commercial names such as "fooler clay" (clay found in a relatively thin vein above the main bentonite or montmorillonite veins in the Black Hills) and various tradenames such as Thixogel #1 (also, "Thixo-Jell") and Gelwhite GP from Georgia Kaolin Co., Elizabeth, New Jersey; Volclay BC and Volclay #325, from American Colloid Co., Skokie, Illinois; Black Hills Bentonite BH 450, from International Minerals and Chemicals; and Veegum Pro and Veegum F, from R. T. Vanderbilt. It is to be recognized that such smectite-type minerals obtained under the foregoing commercial and tradenames can comprise mixtures of the various discrete mineral entities. Such mixtures of the smectite minerals are suitable for use herein.

While any of the impalpable smectite-type clays having a cation exchange capacity of at least about 50 meq/100 g. are useful herein, certain clays are preferred. For example, Gelwhite GP and "fooler clay" are extremely white forms of smectite clays and are preferred for this reason. Volclay BC, which is a smectite-type clay mineral containing at least 3% iron (expressed as $Fe_2O_3$) in the crystal lattice, and which has a very high ion exchange capacity, is one of the most efficient and effective clays from the standpoint of fabric softening performance. Likewise, Thixogel #1, is a preferred clay herein from the standpoint of fabric softening performance. On the other hand, certain smectite clays, such as those marketed under the name "bentonite", are sufficiently contaminated by other silicate minerals that their ion exchange capacity falls below the requisite range, and such clays are of no use in the instant compositions.

Appropriate clay minerals for use herein can be selected by virtue of the fact that smectites exhibit a true 14A x-ray diffraction pattern. This characteristic pattern, together with exchange capacity measurements, provides a basis for selecting suitable impalpable smectite-type clay minerals for use as softeners in the manner of the present invention.

b. Hydrophilic Laponite Clay — A second type of "clay" useful herein are the hydrophilic Laponite® synthetic clays obtainable from Pfizer, Minerals, Pigments and Metals Division, 235 E. 42nd St., New York, New York 10017. The hydrophilic Laponite clays are known to possess anti-static and soil release benefits. Accordingly, it is desirable, from an overall conditioning standpoint, to apply these clays to fabric surfaces in the manner of the present invention. Although the hydrophilic Laponite clays are solids, they have the unique advantage of drying to a thin, transparent film and are virtually undetectable, even on microscopic inspection of fabrics treated therewith. For this reason, the Laponite clays are exceptionally useful herein.

The hydrophilic Laponite clays employed herein are prepared by the coprecipitation and hydrothermal reaction of inorganic compounds to provide a high purity, mineral-like material reminiscent of the hectorites. X-ray analysis indicates that the Laponites are tri-layer minerals wherein an octahedral magnesia sheet is "sandwiched" between two tetrahedral silica sheets, one on each side, via shared oxygen atoms. The two external layers of the Laponite structure contain oxygen and silicon atoms, whereas the internal layer comprises oxygen, hydroxyl, and magnesium groups. The commercially available Laponite 1001, 1501, 2001, 2101, 2501, 2601, 2002 and 2003 materials contain lithium ions in the middle layer, whereas Laponite 3000 does not.

A typical chemical analysis of hydrophilic Laponite is as follows: $SiO_2$ — 53.9%; MgO — 25.2%; $Li_2O$ — 1.5%; F — 5.3%; $Na_2O$ — 3.57%; $Fe_2O_3$ — 0.06%; $Al_2O_3$ — 0.26%; CaO — 0.07%; $SO_3$ — 0.15%; $CO_2$ — 0.19%; structural water — 6.70%.

Along with their x-ray analysis, the hydrophilic Laponite clays are characterized by a high surface area (as measured by nitrogen sorption) usually in the range of about 354 $m^2$/gm; a refractive index of about 1.54; a density of about 2.5 gm/ml; and a free moisture content of about 6%.

A further description of the hydrophilic Laponite clays, along with the physical properties thereof, is set forth in the technical manual entitled "Laponite® for Thixotropic Gels", available from Pfizer, incorporated herein by reference. Further details regarding the Laponites are set forth in the VOLUNTARY RAW MATERIAL REGISTRATION PROGRAM — FOOD AND DRUG ADMINISTRATION — COSMETIC PRODUCTS, and appear under registration numbers 0011620; 0011621; 0011622 and 0011623.

c. Hydrophobic Laponite Clay — A third type of "clay" useful herein are the hydrophobic Laponite® synthetic clays, also obtainable from Pfizer. The hydrophobic Laponite clays are known to provide improved skin feel properties. In the practice of the present invention, these clays are applied to fabric surfaces to impart an overall soft, lubricious handle thereto.

The hydrophobic Laponite clays employed herein are essentially multiple-layer hydrated sodium magnesium silicates. This structure has a net negative charge, which is balanced by exchangeable counterions. The hydrophobic (or organophilic) Laponites are prepared by replacing the exchangeable cation with an organic cation, especially a quaternary ammonium compound.

Typical hydrophobic Laponite clays comprise a base clay (ca. 60%-70% by weight) and a quaternary ammonium compound (ca. 30% -40% by weight). A typical analysis of the base clay is as follows: $SiO_2$ — 63%; MgO — 28%; $Na_2O$ — 2.9%; $Li_2O$ — 1.4%; and structural water — 4.7%.

Various medium-to-long chain quaternary ammonium compounds can be used to prepare the hydrophobic Laponite-type clays, including, for example, dodecyltrimethylammonium chloride, di-tallowalkyldimethylammonium bromide, tetramethylammonium chloride, and the like.

Commercially available hydrophobic Laponite clays include Laponite 4901, Laponite 4902, Laponite 4903, and Laponite 4904, all of which are useful in the present articles and processes.

A further description of the hydrophobic Laponite clays, along with the physical properties thereof, is set forth in the above-referenced technical manual, incorporated herein by reference. Further details regarding the hydrophobic Laponites are set forth in the VOLUNTARY RAW MATERIAL REGISTRATION PROGRAM — FOOD AND DRUG ADMINISTRATION — COSMETIC PRODUCTS, and appear under registration numbers 0011617 and 0011619.

OPTIONAL COMPONENTS

The clay materials herein can optionally be applied to fabrics in combination with an organic fabric softener or anti-static agent to secure additional conditioning benefits therefrom. Any of the known organic softeners can be employed herein. However, since the clays are particularly useful in automatic dryers, it is especially preferred to select softeners adapted for use therein. Such fabric softeners are those which melt (or flow) at dryer operating temperatures and which are transferred from a dispensing means onto clothes coming in contact therewith in the dryer. Representative organic fabric softeners used herein are characterized by a melting point above about 38° C. Lower melting organic softeners flow at room temperature and result in an undesirable tackiness, both in the article and on the fabrics treated therewith. Highly preferred among the optional organic softeners and anti-static agents for use herein are those which melt (or flow) at temperatures from about 45° C to about 70° C, i.e., temperatures within the range found in most home dryers. However, softeners which melt at temperatures up to 100° C, and higher, are useful in commercial dryers.

It is to be understood that mixtures of fabric softeners can be employed herein concurrently to achieve multiple conditioning benefits. For example, various alcohol-type softeners and quaternary ammonium softeners can be used as admixtures which both soften and provide static control benefits.

A typical organic fiber softener optionally employed herein can be any of the cationic (including imidazolinium) compounds listed in U.S. Pat. No. 3,686,025, Morton, TEXTILE SOFTENING AGENTS IMPREGNATED INTO ABSORBENT MATERIALS, issued Aug. 22, 1972, incorporated herein by reference. Such materials are well known in the art and include, for example, the quaternary ammonium salts having at least one, preferably two, $C_{10}$–$C_{20}$ fatty alkyl substituent groups; alkyl imidazolinium salts wherein at least one alkyl group contains a $C_8$–$C_{25}$ carbon "chain"; the $C_{12}$–$C_{20}$ alkyl pyridinium salts, and the like.

Preferred cationic softeners herein include the quaternary ammonium salts of the general formula $R^1R^2R^3R^4N^+,X^-$, wherein groups $R^1$, $R^2$, $R^3$ and $R^4$ are, for example, alkyl, and $X^-$ is an anion, e.g., halide, methylsulfate, and the like, with the non-corrosive methylsulfate being preferred. Especially preferred softeners herein are those wherein $R^1$ and $R^2$ are each $C_{12}$–$C_{20}$ fatty alkyl and $R^3$ and $R^4$ are each $C_1$–$C_4$ alkyl. The fatty alkyl groups can be mixed, i.e., the mixed $C_{14}$–$C_{18}$ coconutalkyl and mixed $C_{16}$–$C_{18}$ tallowalkyl quaternary compounds. Alkyl groups $R^3$ and $R^4$ are preferably methyl.

Exemplary quaternary ammonium softeners herein include ditallowalkyldimethylammonium methylsulfate and dicoconutalkyldimethylammonium methylsulfate.

Another type of organic fabric softener optionally employed in the present aritcles and processes comprises the esterified cyclic dehydration products of sorbitol. Sorbitol, itself prepared by the catalytic hydrogenation of glucose, can be dehydrated in well-known fashion to form mixtures of cyclic 1,4- and 1,5-sorbitol anhydrides, i.e., "sorbitan". (See U.S. Pat. No. 2,322,821, Brown, PARTIAL ESTERS OF ETHERS OF POLYHYDROXYLIC COMPOUNDS, issued June 29, 1943.) The resulting complex mixtures of cyclic anhydrides of sorbitol are collectively referred to herein as "sorbitan".

The optional sorbitan-based softeners are prepared by esterifying the "sorbitan" mixture with a fatty acyl group in standard fashion, e.g., by reaction with a fatty ($C_{10}$–$C_{24}$) acid halide. The esterification reaction can occur at any of the available hydroxyl groups, and various mono-, di-, etc., esters can be prepared. In fact, complex mixtures of mono-, di-, tri-, and tetra-esters almost always result from such reactions, and the stoichiometric ratios of the reactants can simply be adjusted to favor the desired reaction product. The sorbitan mono-esters and di-esters are preferred for use in the present invention, but all such esters are useful.

The foregoing complex mixtures of esterified cyclic dehydration products of sorbitol are collectively referred to herein as "sorbitan esters". Sorbitan mono- and diesters of lauric, myristic, palmitic, stearic and behenic acids are particularly useful herein for imparting a soft, lubricious feel and anti-static benefit to fabrics. Mixed sorbitan esters, e.g., mixtures of the foregoing esters, and mixtures prepared by esterifying sorbitan with fatty acid mixtures such as the mixed tallow and hydrogenated palm oil fatty acids, are useful herein and are economically attractive. Unsaturated $C_{10}$–$C_{18}$ sorbitan esters, e.g., sorbitan mono-oleate, usually are present in such mixtures. It is to be recognized that all sorbitan esters, and mixtures thereof, which soften and flow at dryer operating temperatures, i.e., above about 38° C–40° C, but which are solid below this temperature range, and which have fatty hydrocarbyl "tails", are useful optional softeners in the context of the present invention.

The preferred alkyl sorbitan esters herein comprise sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate, and mixtures thereof, the mixed coconutalkyl sorbitan mono- and di-esters and the mixed tallowalkyl sorbitan mono- and di-esters. The tri- and tetra-esters of sorbitan with lauric, myristic, palmitic, stearic and behenic acids, and mixtures thereof, are also useful herein.

Other types of optional organic fabric softeners and conditioners which can be employed herein comprise higher melting, substantially water-soluble, fatty alcohols, fatty acids, glycerides, and the like. When employed in an automatic clothes dryer, such materials impart the tactile impression of "crispness" or "newness" to the finally dried fabrics.

Useful softeners (or, more broadly, conditioners) of the above type encompass the substantially water-insoluble compounds selected from the group consisting of alcohols, carboxylic acids, carboxylic acid salts, and mixtures of these compounds. By "substantially water-insoluble" herein is meant a water solubility of 1% by weight, or less, at 30° C. The alcohols are preferred for use herein by virtue of their excellent fabric crisping properties. Moreover, alcohol, especially cetyl alcohol, from the treated fabrics can be slowly transferred to skin on contact with the fabric to provide prolonged emolliency benefits. Mono-ols, di-ols and poly-ols having the requisite melting points and water-insolubility properties set forth above are useful herein. Such alcohol-type materials include the mono- and di-fatty glycerides which contain at least one "free" OH group.

All manner of water-insoluble, high melting alcohols (including mono- and di-glycerides), carboxylic acids and carboxylate salts are useful herein, inasmuch as all such materials coat fibers and dry to a nontacky fabric finish. Of course, it is desirable to use those materials which are colorless, so as not to alter the color of the fabrics being treated. Toxicologically acceptable materials which are safe for use in contact with skin should be chosen.

Alcohols and mixtures thereof with melting points below about 38° C are not useful herein. Only those alcohols which are solid or substantially solid at climatic temperatures commonly encountered are employed in the present compositions. Liquid (low melting) alcohols can be applied to fabrics to increase lubricity, but the solid (high melting) alcohols provide the desired benefits without tackiness.

A preferred type of alcohol useful herein includes the higher melting members of the so-called fatty alcohol class. Although once limited to alcohols obtained from natural fats and oils, the term "fatty alcohols" has come to mean those alcohols which correspond to the alcohols obtainable from fats and oils, and all such alcohols can be made by synthetic processes. Fatty alcohols prepared by the mild oxidation of petroleum products are useful herein.

Another type of material which can be classified as an alcohol and which can be employed in the instant articles encompasses various esters of polyhydric alcohols. Such "ester-alcohol" materials which have a melting point within the range recited herein and which are substantially water-insoluble can be employed herein when they contain at least one free hydroxyl group, i.e., when they can be classified chemically as alcohols.

The alcoholic di-esters of glycerol useful herein include both the 1,3-di-glycerides and the 1,2-di-glycerides. The glycerides can be mixed with waxes, triglycerides, and the like, to provide a spectrum of tactile stimuli on the fabrics. In particular, di-glycerides containing two $C_8$–$C_{20}$, preferably $C_{10}$–$C_{18}$, alkyl groups in the molecule provide a soft handle to fabrics which is reminiscent of the effect achieved with the di-long chain alkylammonium fabric softeners in common use.

Mono- and di-ether alcohols, especially the $C_{10}$–$C_{18}$ di-ether alcohols having at least one free —OH group, also fall within the definition of alcohols optionally used herein. The ether-alcohols can be prepared by the classic Williamson ether synthesis. As with the ester-alcohols, the reaction conditions are chosen such that at least one free, unetherified —OH group remains in the molecule.

Non-limiting examples of ester-alcohols useful herein include: glycerol-1,2-dilaurate, glycerol-1,3-dilaurate, glycerol-1,2-myristate, glycerol-1,3-dimyristate, glycerol-1,2-dipalmitate, glycerol-1,3-dipalmitate, glycerol-1,2-distearate and glycerol-1,3-distearate. Mixed glycerides available from mixed tallowalkyl fatty acids, i.e., 1,2-ditallowalkyl glycerol and 1,3-ditallowalkyl glycerol, are economically attractive for use herein. The foregoing ester-alcohols are preferred for use herein due to their ready availability from natural fats and oils.

Ether-alcohols useful herein include glycerol-1,2-dilauryl ether, glycerol-1,3-distearyl ether, and butane tetra-ol-1,2,3-trioctanyl ether.

The substantially water-insoluble $C_{10}$–$C_{20}$ carboxylic acids and the substantially water-insoluble salts thereof, especially the magnesium and calcium salts, having melting points as set forth above are also useful conditioner/softeners in the articles and processes of this invention.

Various other optional additives can also be used in the processes and articles herein. Although not essential to the invention, certain fabric treating additives are particularly desirable and useful, e.g., brightening agents, shrinkage controllers, spotting agents, and the like.

While not essential, liquids which serve as a diluent for the perfumes and optional organic softeners can be employed. Such liquids can be used to more evenly impregnate absorbent carrier substrates with these agents. When a liquid diluent is so used, it should preferably be inert or stable with the agents and with the clays used herein. Moreover, the liquid should be substantially evaporated at room temperatures. Isopropyl alcohol or isopropyl alcohol/water mixtures are the preferred liquid carriers for these purposes; methanol, ethanol, acetone, ethylene glycol or propylene glycol can also be used.

Other additives can include various finishing aids, fumigants, lubricants, fungicides, and sizing agents. Specific examples of useful additives can be found in any current Year Book of the American Association of Textile Chemists and Colorists.

The low-melting and water-soluble "distributing agents" designed to help evenly deposit materials on fabric surfaces can optionally be employed herein. Such materials include urea, lower carboxylic acids, and the like, all as set forth in British Pat. Specification No. 1,313,697, Rapisarda and Rudy, entitled ADDITIVES FOR CLOTHES DRIERS, Apr. 18, 1973, incorporated herein by reference.

The amounts of such additives (e.g., fumigants and brighteners) used herein are generally small, being in the range of from 0.001% to about 10% by weight of the preferred articles.

In preparing the articles herein containing both the clay particles and the optional organic softener and/or anti-stat, it is often advantageous to include a surfactant to help provide easy, yet controlled and uniform release of the organic agents from the carrier. Uniform release helps prevent staining of synthetic fabrics.

Various surfactants are useful herein. For example, the nonionics, especially the well-known ethoxylated fatty alcohols having a hydrophilic-lipophilic balance of from about 2 to about 15, are useful herein. Anionic surfactants, especially tallow alkyl sulfate, can also be employed.

The selection of optimal surfactants will vary somewhat, depending on the type of agents used in the articles. For example, anionic surfactants are preferably not used in combination with cationic softeners, inasmuch as cation-anion reactions occur. Nonionic surfactants are employed with cationic softeners. When nonionic organic softeners (i.e., the alcohol, glyceride and sorbitan softeners) are used in the articles, they can be combined with either anionic or nonionic surfactants.

It is to be understood that, while the selection of surfactants is not critical to the operation of the articles herein, surfactant-softener mixtures can be employed to modify performance properties according to the desires of the formulator. The articles herein can contain from about 0.001% to about 10 percent by weight of article of a surfactant.

DISPENSING MEANS

The clays and optional organic softener and adjunct materials of the foregoing type can be employed by simply placing a measured amount in the dryer, e.g., as a foam, dispersion, or by simply sprinkling them over the fabrics. However, in a preferred embodiment the clay material (optionally with an organic softener) is provided as an article of manufacture in combination with a dispensing means which effectively releases a pre-selected amount in an automatic clothes dryer. Such dispensing means can be designed for single usage or for multiple uses.

One such article comprises a pouch releasably enclosing enough of the clay (with or without organic softener) to condition fabrics during several cycles of clothes. This multi-use article can be made by filling a hollow, open pore polyurethane sponge pouch with about 10 grams of the dry clay. In use, the tumbling action of the dryer causes the clay particles to pass through the pores of the sponge and onto the fabrics. Such a filled sponge can be used to treat several loads of fabrics in conventional dryers, and has the advantage that it can remain in the dryer after use and is not likely to be misplaced or lost.

Another article comprises a perforated plastic bag releasably enclosing an aqueous gel made from the clay. The tumbling action of the dryer dispenses the clay gel, which dries to a conditioning film on the surface of the fabrics.

A highly preferred article herein comprises the clay particles releasably affixed to a sheet of paper or woven or non-woven cloth substrate such that the action of the automatic dryer removes the particles and deposits them on the fabrics. As more fully described hereinafter, the clay particles can be releasably affixed to the sheet substrates in various ways, including by means of a melt of any of the abovedisclosed, optional organic fabric softeners.

The sheet form has several advantages. For example, effective amounts of the clay particles for use in conventional dryers can be easily sorbed onto and into the sheet substrate by simple dipping or padding processes. Thus, the user need not measure the amount of material necessary to condition fabrics. Additionally, the flat configuration of the sheet provides a large surface area which results in efficient release of the particles onto fabrics by the tumbling action of the dryer.

The water-insoluble paper, or woven or non-woven substrates used in the sheet articles herein can have a dense, or more preferably, open or porous structure. Examples of suitable materials which can be used as substrates herein include paper, woven cloth, and non-woven cloth. The term "cloth" herein means a woven or non-woven substrate for the articles of manufacture, as distinguished from the term "fabric" which emcompasses the clothing fabrics being treated.

Highly preferred paper, woven or non-woven "absorbent" substrates useful herein are fully disclosed in U.S. Pat. No. 3,686,025, Morton, TEXTILE SOFTENING AGENTS IMPREGNATED INTO ABSORBENT MATERIALS, issued Aug. 22, 1972, incorporated herein by reference. These substrates are particularly useful with articles comprising both the clay particles and an optional organic fabric softener. It is known that most substances are able to absorb a liquid substance to some degree; however, the term "absorbent", as used herein, is intended to mean a substance with an absorbent capacity (i.e., a parameter representing a substrate's ability to take up and retain a liquid) from 5.5 to 12, preferably 7 to 10, times its weight of water.

Dense, one-ply or ordinary kraft or bond paper in articles containing the clays can also be used herein as a dispensing means.

As noted above, suitable materials which can be used as a substrate in the invention herein include, among others, sponges, paper, and woven and non-woven cloth. The preferred substrates of the compositions herein are cellulosic, particularly multi-ply paper and non-woven cloth; see U.S. Pat. No. 3,414,459, Wells, COMPRESSIBLE LAMINATED PAPER STRUCTURE, issued Dec. 3, 1968, the disclosures of which are incorporated herein by reference, for a preferred paper substrate for use herein.

Preferred non-woven cloth substrates herein are water-laid or air-laid and are made from cellulosic fibers, particularly from regenerated cellulose or rayon, which are lubricated with any standard textile lubricant. Preferably, the fibers are from 3/16 inch to 2 inches in length and are from 1.5 to 5 denier. Preferably, the fibers are at least partially oriented haphazardly, particularly substantially haphazardly, and are adhesively bonded together with a hydrophobic or substantially hydrophobic binder-resin, particularly with a nonionic self-crosslinking acrylic polymer or polymers. Preferably, the cloth comprises about 70% fiber and 30% binder-resin polymer by weight and has a basis weight of from about 20 to 24 grams per square yard.

The fabric conditioning articles of the present invention are structured to be compatible with conventional laundry dryer designs. While it is preferred to employ the articles of the present invention in an automatic laundry dryer, other equivalent machines can be employed, and in some instances, heat and drying air may be omitted for part or all of the cycle. Generally, however, heated air will be employed and such air will be circulated frequently in the dryer. Normally, there are from about 5 to 50 volume changes of drying air in the dryer drum per minute and the air moves at about 125 to 175 cubic feet per minute. These changing volumes of air create a drawing or suction effect which can, especially with small fabric loads, cause an item such as a sock, handkerchief or the like, or a fabric conditioning article, to be disposed on the surface of the air outlet of the dryer. A usual load of fabrics of from about 4 to 12 pounds dry weight will fill from about 10% to 70% of the volume of most dryers and will normally pose little difficulty. A sufficient number of tumbling items will normally be present to prevent any item from being drawn to the exhaust outlet or to cause it to be removed from the outlet. In the event, however, a fabric conditioning article is caused to be disposed in relation to the air exhaust outlet in such a manner as to cause blockage of passing air, undesirable temperature increases can result. In the case of fabric conditioning articles employing the normally solid or waxy organic softeners (e.g., sorbitan esters) which soften or melt under conditions of heat, the article may tend to adhere to an exhaust outlet.

The problem of blockage can be solved by providing openings in the article in the manner described in the U.S. patent applications of A. R. McQueary, Ser. No. 347,605, filed Apr. 3, 1973, and Ser. No. 347,606, filed Apr. 3, 1973, both incorporated herein by reference. More specifically, slits or holes are cut through the substrate to allow free passage of air.

The type and number of slit openings can vary considerably and will depend on the nature of the substrate material, its inherent flexibility or rigidity, the nature of the conditioning agent carried therein or thereon, and the extent to which increased passage of air therethrough is desired. The articles of this invention can comprise a large number of small slits of various types or configurations, or fewer larger slits. For example, a single rectilinear or wavy slit, or a plurality thereof, confined to within the area of a sheet and extending close to opposite edges of the article, can be employed. By maintaining a border around all edges of the conditioning article, a desired degree of flexibility and surface area availability to tumbling fabrics can be maintained. While, for example, rectilinear slits can be cut into a conditioning article completely to the edges of the article, confinement of the slits to within the area of the article will be preferred where the convenience of packaging the conditioning article in roll form is desired.

According to one preferred embodiment of the invention, a sheet of fabric-conditioning article is provided with a plurality of rectilinear slits extending in one direction, e.g., the machine direction of the web substrate, and in a substantially parallel relationship. The slits can be aligned or in a staggered relationship. A preferred embodiment will contain from 5 to 9 of such slits which will extend to within about 2 inches and preferably 1 inch from the edge of the web material which is, for example, a 9 inches × 11 inches sheet.

The slit openings in the conditioning articles of the invention can be in a variety of configurations and sizes, as can be readily appreciated. In some instances, it may be desirable to provide slit openings as C-, U-, or V-shaped slits. Such slits arranged in a continuous or regular or irregular pattern are desirable from the standpoint of permitting gate-like or flap structures which permit the passage of air therethrough.

In accordance with a preferred embodiment of the invention, a plurality of curvilinear slit openings, such as U-shaped, or C-shaped slits, are provided in a continuously patterned arrangement. These slit arrangements provide flap-like or gate-like structures which should approximate the size of the perforations normally employed in laundry dryer exhaust outlets. A width dimension of from about 0.02 to about 0.40 inch is preferred. U- or C-shaped slits, e.g., about ⅛ in diameter, are desirably provided in close proximity to each other, e.g., about ⅛ apart, as to simulate, for example, a fish-scale pattern. Such design, in addition to permitting passage of air, provides a degree of flexibility to the substrate and allows flexing or puckering of the article in use. Similarly, the slit openings can be arranged as spaced rows of slits or as a plurality of geometrical patterns. For example, a sheeted article of this invention can comprise a plurality of squares, circles, triangles or the like, each of which is comprised of a plurality of individual slits. Other embodiments including small or large S-shaped slits, X-slits or crosses, slits conforming to alphabetical or numerical patterns, logograms, marks, floral and other designs can also be employed.

As an alternative to slits, the article can be provided with one or more circular holes having a diameter of from about 0.02 inches to about 4 inches, from about 5% to about 40% of the surface area of the article comprising said holes. The holes can be disposed in any convenient relationship to one another but it is simplest, from a manufacturing standpoint, to punch the holes through the substrate in evenly spaced rows.

ARTICLE MANUFACTURE

The articles herein comprise the clays and dispensing means, optionally in combination with an organic softener. When the dispensing means is to be a porous pouch, the clays, either as solid particles or as gels, and optional ingredients, are simply admixed thoroughly and placed in the pouch, which is then sewn, or otherwise permanently sealed. The pouch is fashioned from a material whose average pore diameter is 10% to 15% larger than any solids contained therein. The tumbling action of the dryer causes the material to pass through the pores evenly onto all fabric surfaces.

Preferred articles herein are provided in sheet form, for the reasons disclosed above. A dispensing means comprising a carrier sheet is releasably coated with sufficient clay to treat one average load (6–8 lbs.) of fabrics. The coating process involves, for example, coating the sheet with an inert, unobjectionable, somewhat tacky material such as any of the marine agars or glycols, and thereafter impressing the desired amount of clay into the coating. Heat and the tumbling action of the dryer releases the clay onto fabric surfaces.

When articles comprising both the clay and an organic softener, most preferably wherein the softener is impregnated into the absorbent sheet substrate, are prepared, the softener provides both a fabric softening action and a means whereby the clay can be releasably affixed to the sheet.

Impregnation with an organic softener or other affixing agent for the clay can be done in any convenient manner, and many methods are known in the art. For example, the agent, in liquid form, can be sprayed onto a substrate or can be added to a wood-pulp slurry from which the substrate is manufactured. Sufficient agent remains on the surface to conveniently affix the particles to the substrate.

In a preferred method of making the sheeted articles herein, the affixing agent (alone or with the optional additives) is applied to absorbent paper or nonwoven cloth by a method generally known as padding. The agent is preferably applied in liquid (melted) form to the substrate. The clay particles can thereafter be applied to the treated substrate in various ways.

In one preferred method, the clay and affixing agent such as an alkylene glycol are placed in a pan or trough which can be heated to maintain the agent in liquid form. To the liquid agent are then added any desired additives. A roll of absorbent paper (or cloth) is then set up on an apparatus so that it can unroll freely. As the paper unrolls, it travels downwardly and, submersed, passes through the pan or trough containing the liquified agent at a slow enough speed to allow sufficient impregnation. The absorbent paper then travels upwardly and through a pair of rollers which remove excess bath liquid and provide the paper with about 0.5 to about 12 grams of the agent per 100 in.$^2$ to 150 in.$^2$ of substrate sheet. The impregnated paper is then uniformly coated with the clay particles (generally 0.1 g. to 15 g. per 100 in.$^2$ to 150 in.$^2$) and cooled to room temperature, after which it can be folded, cut or perforated at uniform lengths, and subsequently packaged and/or used.

In another method, the affixing agent (or organic softener), in liquid form, is sprayed onto absorbent paper as it unrolls and the excess softener is then squeezed off by the use of squeeze rollers or by a doctor-knife. Other variations include the use of metal "nip" rollers on the leading or entering surfaces of the sheets onto which the agent is sprayed; this variation allows the absorbent paper to be treated, usually on one side only, just prior to passing between the rollers whereby excess affixing agent is squeezed off. This variation can optionally involve the use of metal rollers which can be heated to maintain the agent in the liquid phase. Optionally, the clay can be impressed onto the sheet by means of such rollers.

Following application of the liquified affixing agent and the clay, the articles are held at room temperature until the agent solidifies. The resulting dry articles remain flexible; the sheet articles are suitable for packaging in rolls. The sheet articles can optionally be slitted or punched to provide a nonblocking aspect at any convenient time during the manufacturing process.

USAGE

The clay-based fabric conditioning compositions herein comprise clay mixtures selected from mixtures of hydrophilic Laponite clay and hydrophobic Laponite clay, at a weight ratio of hydrophilic Laponite to hydrophobic Laponite of from about 20:1 to about 1:20; mixtures of hydrophilic Laponite clay and smectite clay, at a weight ratio of hydrophilic Laponite to smectite of from about 20:1 to about 1:20; and mixtures of hydrophobic Laponite clay and smectite clay, at a weight ratio of hydrophobic Laponite to smectite clay of from about 20:1 to about 1:20. Preferred clay mixtures herein comprise hydrophilic Laponite clay and smectite clay at a weight ratio of hydrophilic Laponite:smectite of from about 1:10 to about 1:1, and mixtures of hydrophilic Laponite and hydrophobic Laponite at a weight ratio of hydrophilic Laponite: hydrophobic Laponite of from about 1:10 to about 1:1. In such mixtures, the hydrophilic Laponite provides desirable anti-static benefits, whereas the smectite and hydrophobic Laponite provide desirable fabric softening benefits. It is to be recognized that the clay mixtures need contain only minor amounts of the hydrophilic Laponite (within the specified range) to provide anti-static benefits.

Both the smectite clays and the hydrophobic and hydrophilic Laponites employed herein are impalpable, and generally fall within a size range of from about 0.01 micron to about 50 microns, more generally from about 1 micron to about 10 microns.

An effective amount of the clay mixtures herein, i.e., at least about 0.005 gram/m$^2$, more preferably from about 0.05 to about 0.10 g./m$^2$, is applied to fabrics. In practice, from about 0.5 g. to about 12 g., more preferably from about 1.0 g. to about 5.0 g., of the clay mixtures herein are combined with an average of about 5 lbs. of fabrics, either in a rinse bath or in an automatic clothes dryer, to provide the desirable softening and anti-static benefits afforded by the clay mixtures.

The clay mixtures herein can conveniently be combined with various water-soluble carriers. Such carriers can be, for example, various detergency builders, and any of the well-known detergency builders and mixtures thereof known in the art can be used for this purpose. As representative, non-limiting examples of such detergency builders which can be employed in combination with the clay mixtures herein, there can be mentioned sodium tripolyphosphate, sodium citrate, sodium nitrilotriacetate, sodium ethylenediaminetetraacetate, sodium bicarbonate, sodium mellitate, and the like. Compositions which are desirably added to rinse baths comprise any of the above-mentioned clay mixtures and the builder-carriers at a weight ratio of clay:carrier of from about 1:10 to about 1:1. Other carriers include sodium sulfate, sodium chloride, potassium acetate, sodium silicate, and the like.

Other rinse-additive compositions employing the clays are those wherein a liquid carrier is employed. Such liquid carriers are selected from those which are miscible with an aqueous rinse bath. Preferred carriers for the clay mixtures include, for example, water or water-alcohol mixtures, e.g., mixtures of water and lower alcohols such as ethanol, isopropanol, and the like, at a water:alcohol weight ratio of from about 95:5 to about 85:15. Such fluid compositions can contain from about 10% to about 40% by weight of the clay mixtures herein disclosed suspended in the fluid. Alternatively, the clays can be added to fluid carrier and gelled with electrolyte additives such as sodium sulfate, sodium chloride, or the like (as disclosed in the Laponite trade catalog referenced hereinabove) to provide a fluid gel having a viscosity in the range from about 400 centipoise (cps) to about 4000 cps. The gel can be added to a fabric-containing rinse bath.

When the clay mixtures are used in combination with an organic softener and/or anti-stat of the type disclosed above, the clay mixture is desirably employed at a weight ratio of clay mixture:organic of from about 20:1 to 1:1, more preferably 10:1 to 1:1, thereby minimizing the amount of fatty-based organic conditioning agent.

It is to be recognized that the "effective amount" of the clay mixtures employed herein can vary, according to the desires of the user, the type of fabric being treated, the relative humidity of the surrounding atmosphere (with attendant effects on static charge in the fabrics) and like factors. The above-disclosed ratios and usage levels give good results over a wide variety of conditions, but are in no way intended to be limiting of the scope of the invention.

In a preferred mode, the process herein is carried out in the following manner. Damp fabrics, usually containing from about 1 to about 1.5 times their weight of water, are placed in the drum of an automatic clothes dryer. In practice, such damp fabrics are commonly obtained by laundering, rinsing and spin-drying the fabrics in a standard washing machine. An article prepared in the manner of this invention releasably containing an effective amount of a clay mixture is simply added thereto. The dryer is then operated in standard fashion to dry the fabrics, usually at a temperature from about 50° C to about 80° C for a period from about 10 minutes to about 60 minutes, depending on the fabric load and type. The tumbling action of the revolving dryer drum evenly distributes the active ingredients from the article over all fabric surfaces, and the heat dries the fabrics. On removal from the dryer, the dried fabrics are desirably conditioned.

The following examples illustrate the practice of this invention. It is to be recognized that the preferred clay mixtures disclosed above desirably impart both an anti-static and softening benefit to fabrics treated therewith. If desired, a given clay can be used singly to provide either a softening (hydrophobic Laponite or smectite) or an anti-static (hydrophilic Laponite) benefit. Alternatively, a single clay can be used in combination with an organic agent to provide the combined softening and anti-static benefits. Usage levels, article manufacture, etc., will be as disclosed above for the clay mixtures.

EXAMPLE I

Hydrophilic Laponite 1501 (10 grams) and Thixogel (25 grams) are suspended in 1 liter of water using 2.0 grams of sodium carboxmethylcellulose as a suspending aid.

Freshly laundered fabrics (8 lbs.) are suspended in 15 gallons of water and 250 mls. of the foregoing composition are added thereto. The fabrics are agitated for ca. 3 minutes, spun dried and dried in an automatic clothes dryer.

Fabrics treated in the foregoing manner are provided with a soft, anti-static finish. The clay particles are not visible on inspection.

In the foregoing composition and process, the mixture of clays is replaced by 35 grams of the following clay mixtures, respectively, and good fabric conditioning results are secured: 1:10 (wt.) mixture of hydrophilic Laponite 1001 and hydrophobic Laponite 4903; 1:1 wt. mixture of hydrophobic Laponite 4903 and Gelwhite GP; and a 1:1:1 wt. mixture of Laponite 1001, Laponite 4903 and Gelwhite GP.

EXAMPLE II

A perforated polyethylene pouch (ca. 10 perforations of 0.2 mm diameter/10 $cm.^2$) containing a fluid gel (2000 cps) comprising 10% hydrophilic Laponite 2001, 25% Gelwhite GP, 2% sodium chloride, balance, water, is prepared. Conveniently, the pouch contains 20 grams of the gel.

The foregoing pouch is placed together with 8 lbs. of damp (ca. 10 lbs. water) fabrics in an automatic clothes dryer. The fabrics are dried, with constant tumbling, at an average temperature of 70° C. During the drying operation the gel is uniformly dispersed over all fabric surfaces and, itself, dried to provide a visibly undetectable anti-static and softening film on the fabrics.

EXAMPLE III

A dryer-added fabric softening article is prepared by spraying 5.0 grams of a 1:1 mixture of colloidal hydrophilic Laponite 1001 and smectite (Gelwhite GP; avg. size 10 microns) uniformly over the surface of an air-laid non-woven cloth comprising 70% regenerated cellulose (American Viscose Corporation) and 30% hydrophobic binder-resin (Rhoplex HA-8 on one side of the cloth, and Rhoplex HA-16 on the other side; Rohm & Haas, Inc.). The cloth has a thickness of 4 to 5 mils, a basis weight of about 24 grams per square yard and an absorbent capacity of 6. A one-foot length of the cloth, 8⅓ inches wide, weighs about 1.78 grams. The fibers in the cloth are ca. ¼ inch in length, 1.5 denier, and are oriented substantially haphazardly. The fibers in the cloth are lubricated with sodium oleate. The substrate cloth is 10 inches × 11 inches. The cloth retains its flexibility.

The cloth is slitted with a knife; conveniently, the cloth is provided with 5 to 9 rectilinear slits extending along one dimension of the substrate, said slits being in a substantially parallel relationship and extending to within about one inch from at least one edge of said dimension of the substrate. The width of an individual slit is ca. 0.2 inch.

An article prepared in the foregoing manner is placed in an automatic clothes dryer together with 5 lbs. of freshly washed, damp (ca. 5.5 lbs. water) mixed cotton, polyester, and polyester/cotton blend clothes. The automatic dryer is operated at an average temperature of 60° C for a period of 45 minutes. During the course of the drying operation, the clothes and article are constantly tumbled together by the rotation of the dryer drum. After the drying cycle, the clothes are removed from the dryer into a room having a relative humidity of 50. The clothes are found to exhibit excellent softness and anti-static properties.

EXAMPLE IV

A rinse-added fabric softener is as follows. Ten grams of hydrophobic Laponite 4903 and 0.1 gram of ditallowalkyldimethylammonium chloride (anti-stat) are suspended in 20 mls. of a 90:10 (wt.) water-ethanol mixture.

Ten mls. of the foregoing composition are added to 5 lbs. of fabrics in 15 gallons of water. The fabrics are agitated 5 minutes and spun-dry. After drying, the fabrics are found to be provided with a soft, anti-static finish.

EXAMPLE V

The sheet carrier of Example III is coated with 0.5 gram of melted sorbitan dibehenate. Five grams of a 1:1 (wt.) mixture of hydrophilic Laponite 2101 and Volclay BC are uniformly impressed into the soft sorbitan ester, which is then allowed to dry.

The sheet article prepared in the foregoing manner is used to treat damp fabrics in the manner of Example III. Excellent conditioning results are secured.

In the article of Example V the mixture of clays is replaced by an equivalent amount of Gelwhite GP and the sorbitan ester is replaced by an equivalent amount of sorbitan monostearate and ditallowalkyldimethylammonium methylsulfate, respectively, and good conditioning results are secured.

What is claimed is:

1. An article of manufacture especially adapted for conditioning fabrics, comprising:

a. an effective amount of a clay mixture selected from: mixtures of hydrophilic Laponite clay and hydrophobic Laponite clay, at a weight ratio of hydrophilic Laponite to hydrophobic Laponite of from about 20:1 to about 1:20; mixtures of hydrophilic Laponite clay and smectite clay, at a weight ratio of hydrophilic Laponite to smectite of from about 20:1 to about 1:20; and mixtures of hydrophobic Laponite clay and smectite clay at a weight ratio of hydrophobic Laponite clay of from about 20:1 to about 1:20; said clay mixture being in releasable combination with;

b. a water-insoluble dispensing means.

2. An article according to claim 1 wherein the clay mixture comprises hydrophilic Laponite clay and smectite clay at a weight ratio of hydrophilic Laponite: smectite from about 1:10 to about 1:1.

3. An article according to claim 1 wherein the clay mixture hydrophilic Laponite and hydrophobic Laponite at a weight ratio of hydrophilic Laponite: hydrophobic Laponite from about 1:10 to about 1:1.

4. An article according to claim 1 wherein the clay mixture is in the form of an aqueous gel and wherein the dispensing means is a perforated pouch.

5. An article according to claim 1 wherein the clay mixture is in a substantially dry state and wherein the dispensing means is a paper or woven or non-woven cloth sheet.

6. An article according to claim 1, comprising, as an additional component, an effective amount of an organic fabric conditioner.

7. An article according to claim 6 wherein the organic fabric conditioner is a fatty-based material selected from quaternary ammonium salts and sorbitan esters.

8. A process for conditioning fabrics comprising applying thereto an effective amount of a clay mixture selected from: mixtures of hydrophilic Laponite clay and hydrophobic Laponite clay, at a weight ratio of hydrophilic Laponite to hydrophobic Laponite of from about 20:1 to about 1:20; mixtures of hydrophilic Laponite clay and smectite clay, at a weight ratio of hydrophilic Laponite to smectite of from about 20:1 to about 1:20; and mixtures of hydrophobic Laponite clay and smectite clay, at a weight ratio of hydrophobic Laponite to smectite clay of from about 20:1 to about 1:20.

9. A process according to claim 8 which is carried out by tumbling damp fabrics in a clothes dryer with an effective amount of the clay mixture.

* * * * *